United States Patent
Swett et al.

(10) Patent No.: US 9,063,242 B2
(45) Date of Patent: Jun. 23, 2015

(54) ACOUSTIC TRANSDUCERS WITH DYNAMIC FREQUENCY RANGE

(75) Inventors: Dwight W. Swett, Houston, TX (US); James V. Leggett, III, Magnolia, TX (US); Mark S. Solly, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 737 days.

(21) Appl. No.: 13/272,396

(22) Filed: Oct. 13, 2011

(65) Prior Publication Data
US 2012/0090837 A1 Apr. 19, 2012

Related U.S. Application Data

(60) Provisional application No. 61/393,045, filed on Oct. 14, 2010.

(51) Int. Cl.
*G01V 1/135* (2006.01)
*G01V 1/52* (2006.01)

(52) U.S. Cl.
CPC .......... *G01V 1/135* (2013.01); *G01V 2001/526* (2013.01)

(58) Field of Classification Search
CPC ............ G01V 1/40; G01V 1/52; G01V 1/44; G01V 1/46; G01V 1/48; G01V 1/50; G01V 1/135; G01V 1/133
USPC ................. 166/250.01, 249.66, 177.1, 254.2; 367/25, 83; 181/104, 109, 119; 381/162, 165; 73/152.16
See application file for complete search history.

(56) References Cited

U.S. PATENT DOCUMENTS

| | | | | |
|---|---|---|---|---|
| 4,202,425 | A * | 5/1980 | Hambrick et al. ............ | 181/120 |
| 4,722,417 | A * | 2/1988 | Selsam ........................ | 181/119 |
| 5,063,542 | A * | 11/1991 | Petermann et al. .......... | 367/166 |
| 5,283,768 | A * | 2/1994 | Rorden ......................... | 367/83 |
| 6,213,250 | B1 | 4/2001 | Wisniewski et al. | |
| 6,318,497 | B1 | 11/2001 | De Groot et al. | |
| 7,570,543 | B2 | 8/2009 | Ferguson | |
| 2005/0022987 | A1* | 2/2005 | Green et al. ............. | 166/250.17 |
| 2012/0069708 | A1* | 3/2012 | Swett ............................ | 367/81 |

OTHER PUBLICATIONS

International Search Report and Written Opinion dated Jun. 1, 2012 for International Application No. PCT/US2011/056258, all references in PCT are cited above.

* cited by examiner

*Primary Examiner* — Nicole Coy
*Assistant Examiner* — Kristyn Hall
(74) *Attorney, Agent, or Firm* — Cantor Colburn LLP

(57) ABSTRACT

In one aspect, an apparatus for use downhole is provided, which apparatus, in one embodiment, includes an acoustic transducer having a first member in pressure communication with a confined fluid, wherein a displacement of the first member causes a volume change in the confined fluid that amplifies displacement of a second member to generate a pressure wave in medium.

12 Claims, 3 Drawing Sheets

US 9,063,242 B2

ACOUSTIC TRANSDUCERS WITH DYNAMIC FREQUENCY RANGE

CROSS-REFERENCE TO RELATED APPLICATIONS

This application takes priority from U.S. Provisional Application Ser. No. 61/393,045, filed on Oct. 14, 2010, which is incorporated herein in its entirety by reference.

BACKGROUND

1. Field of the Disclosure

This disclosure relates to wide-band acoustic transducers and methods of making and using such transducers in acoustic tools for downhole well logging and other applications.

2. Background Art

Typical downhole acoustic logging tools utilized for estimating formation properties include one or more acoustic transmitters or sources and a number of acoustic receivers. The transmitters induce acoustic energy into the formation surrounding the wellbore. The transmitted acoustic signals are reflected by interfaces associated with the formation. The reflected acoustic signals are detected by the receivers in the logging tool and processed to provide estimates of one or more properties of the formation. Majority of such transmitters operate effectively in relatively high frequency range, such as, for example, between 10 KHz to 20 KHz. The depth of investigation depends upon the frequency of the transmitted signals. In certain downhole applications it is desirable to determine formation properties at various depths, wherein a single transducer may be used over different frequency ranges, including a low frequency range, such as, for example, 1 kHz-3 kHz, mid frequency range, such as 4 KHz-8 KHz and high frequency range, such as above 10 KHz.

The disclosure herein provides acoustic transmitters that can operate over a relatively broad frequency range, including the low frequency range of 1 KHz-3 K Hz.

SUMMARY

In one aspect, an apparatus for use downhole is provided, which apparatus, in one embodiment, includes an acoustic transducer having a first member in pressure communication with a substantially incompressible confined fluid, wherein a displacement of the first member causes a volume change in the confined fluid that amplifies displacement of a second member to generate a pressure wave in medium. In one aspect, the transducer further includes an acoustic diaphragm in pressure communication with the second member configured to generate the pressure wave. In another aspect, the displacement amplification is a function of first area associated with the first member and a second area associated with the second member. In another aspect, the first area is greater than the second area.

Examples of certain features of the apparatus and method disclosed herein are summarized rather broadly in order that the detailed description thereof that follows may be better understood. There are, of course, additional features of the apparatus and method disclosed hereinafter that will form the subject of the claims appended hereto.

BRIEF DESCRIPTION OF THE DRAWINGS

The present disclosure is best understood with reference to the accompanying figures in which like numerals refer to like elements and in which.

DESCRIPTION OF ILLUSTRATIVE EMBODIMENTS

Figure 1:
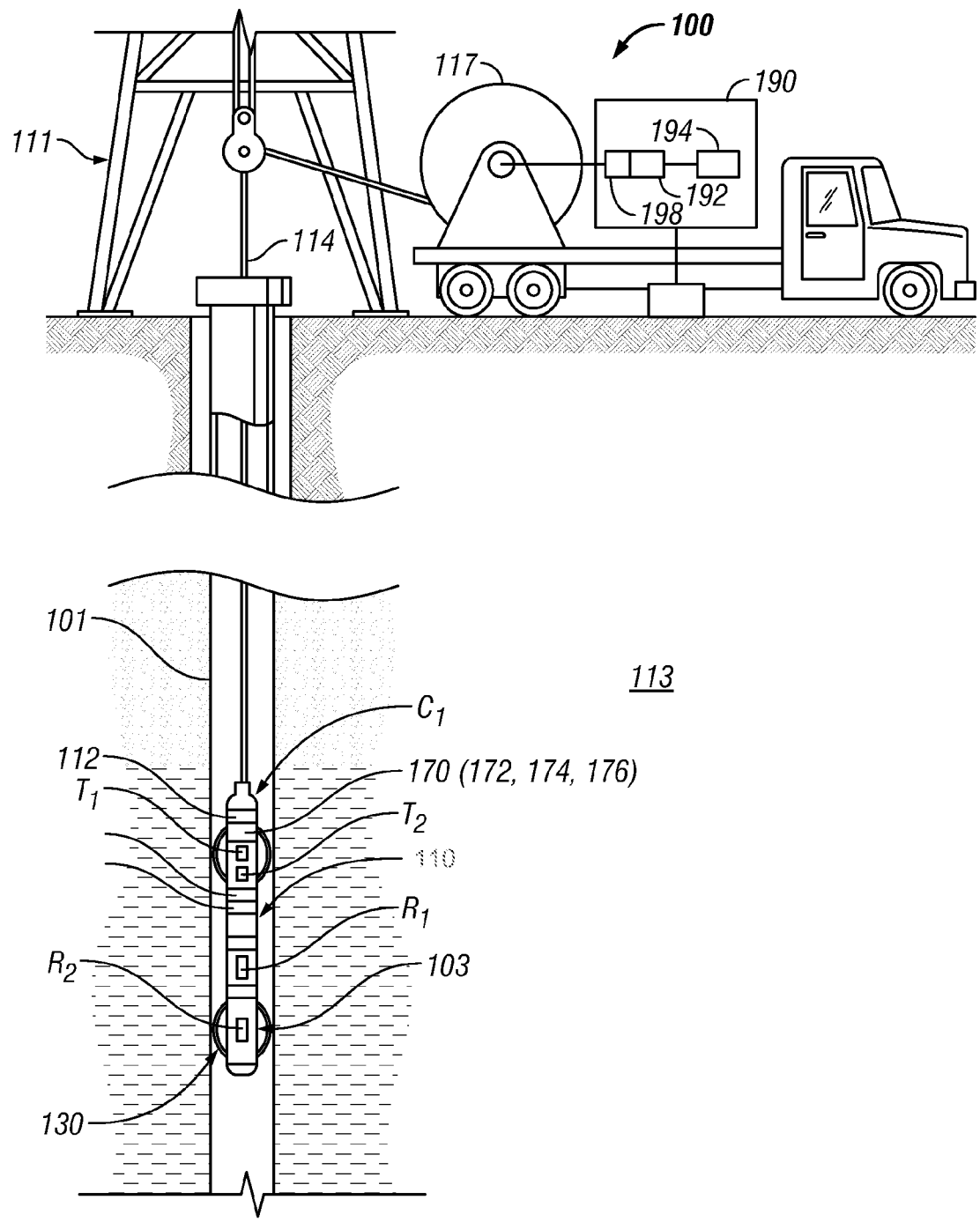
FIG. 1 shows an acoustic well logging tool configured to utilize acoustic transducers made according to this disclosure.

FIG. 1 shows a schematic illustration of an exemplary well logging system 100. System 100 is shown to include a logging instrument or tool 110 conveyed into a wellbore or borehole 101 formed in an earth formation 113. The tool 110 may be conveyed into the wellbore 101 by any suitable conveying member 114, such as an electrical armored cable (also referred to as "wireline"), a slick line, a coiled-tubing, etc. The conveying member 114 may be spooled on a winch 117 or similar device known in the art. The conveying member 114 may be conveyed into the wellbore 101 using a platform or rig 111 at the surface. The conveying member 114 is electrically connected at one end to a surface control unit 190 and at the other end to the tool 110. The control unit 190 may be a computer-based system configured to process data or signals provided by the tool 110 to estimate one or more parameters of interest, send command signals to various components of the tool 110 and generally control the operation of the tool 110. The control unit 190 includes a processor 192, a data storage device 194 and programs 198 to process data and control the operations of the tool 110. The control unit 190 may also include a display unit and peripherals to enter data and to provide a human interfaced. A telemetry unit or device 112 may be used to establish bi-directional data communication between the tool 110 and the control unit 190. The tool 110 also may include a control unit 170, which may further include a processor 172 (such as a microprocessor), data storage device 174, such as a solid-state memory, and computer programs 176 configured to be used by the processor 172 for executing instructions contained in such programs 176. The signals transmitted by the tool 110 to the surface control unit 190 and the signals transmitted by the control unit 190 to the tool 110 are decoded, interpreted, recorded and processed by the respective control units.

Figure 2:
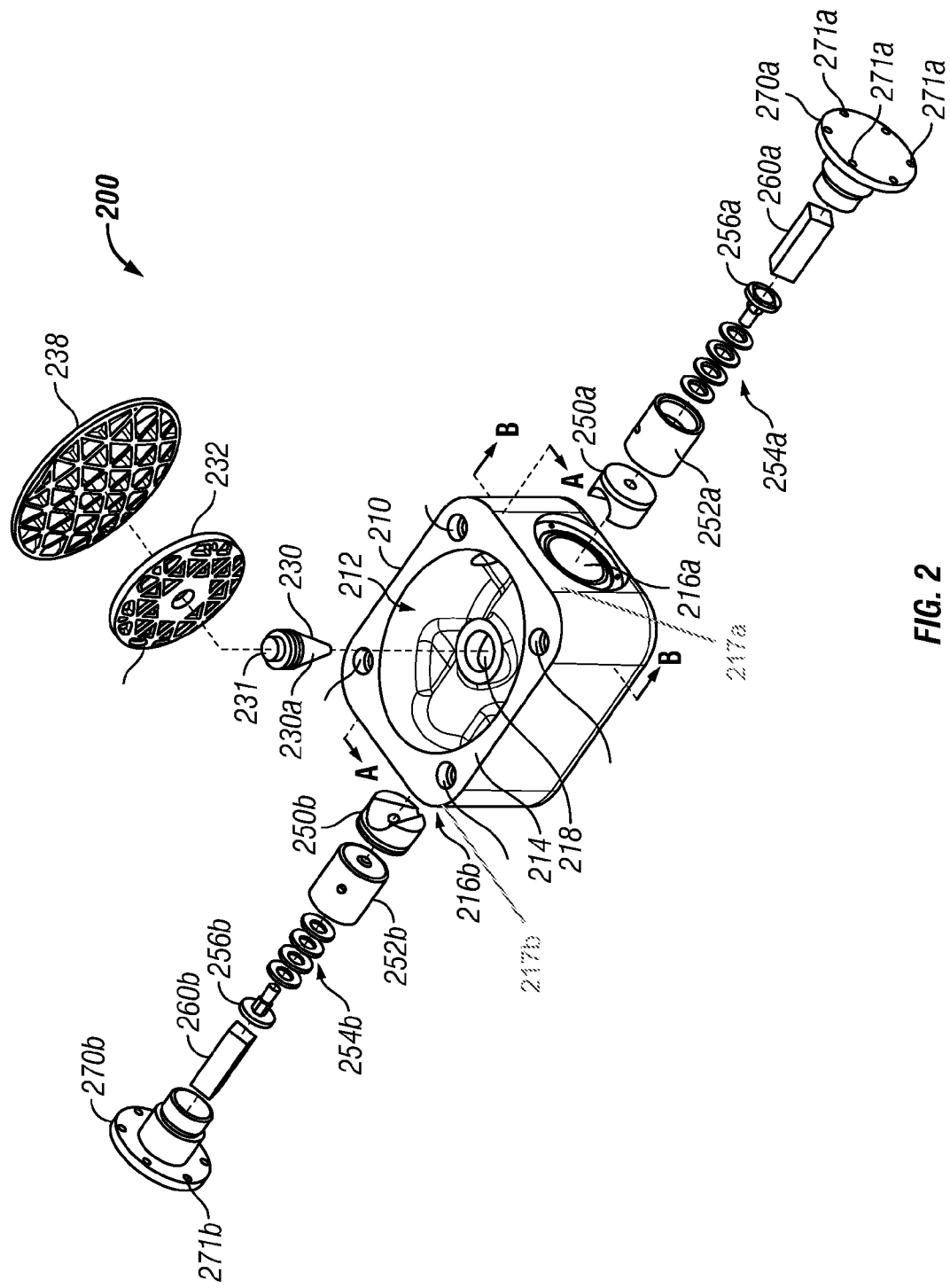
FIG. 2 is a perspective view of various components of an exemplary transducer laid out in the manner assembled to make the transducer.
Figure 3:
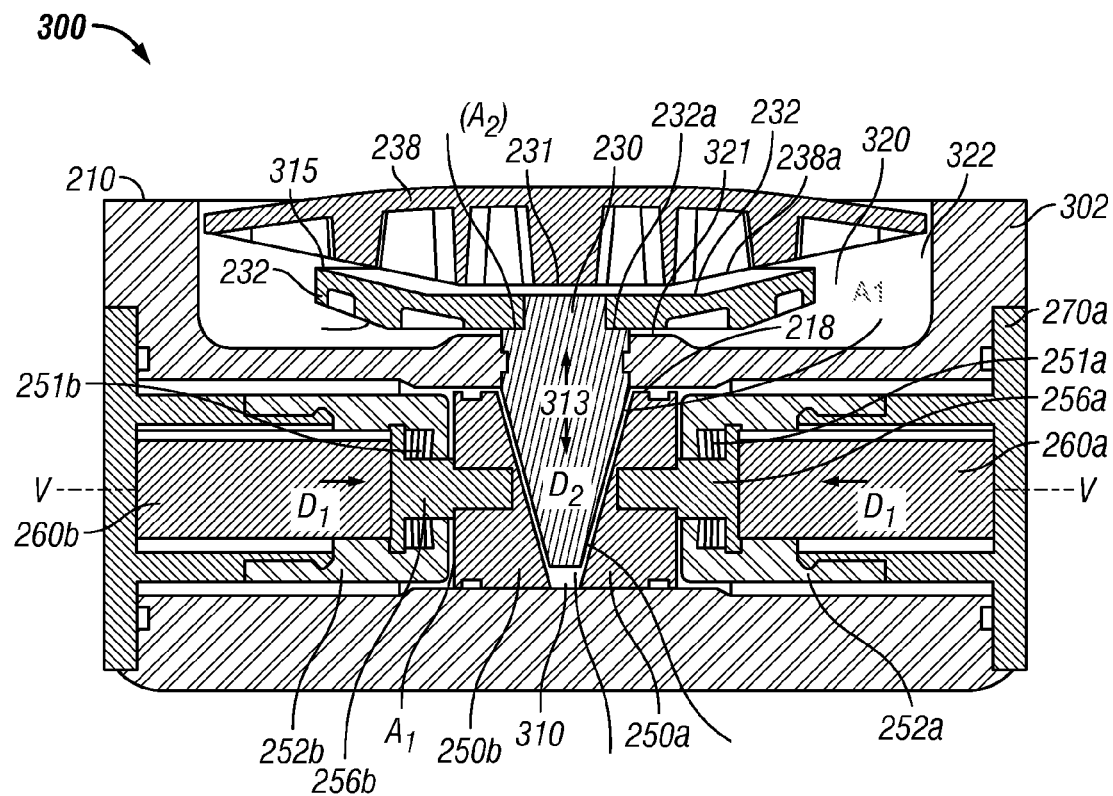
FIG. 3 is a cross-section diagram taken along A-A once the exemplary transducer shown in FIG. 1 has been assembled.
Figure 4:
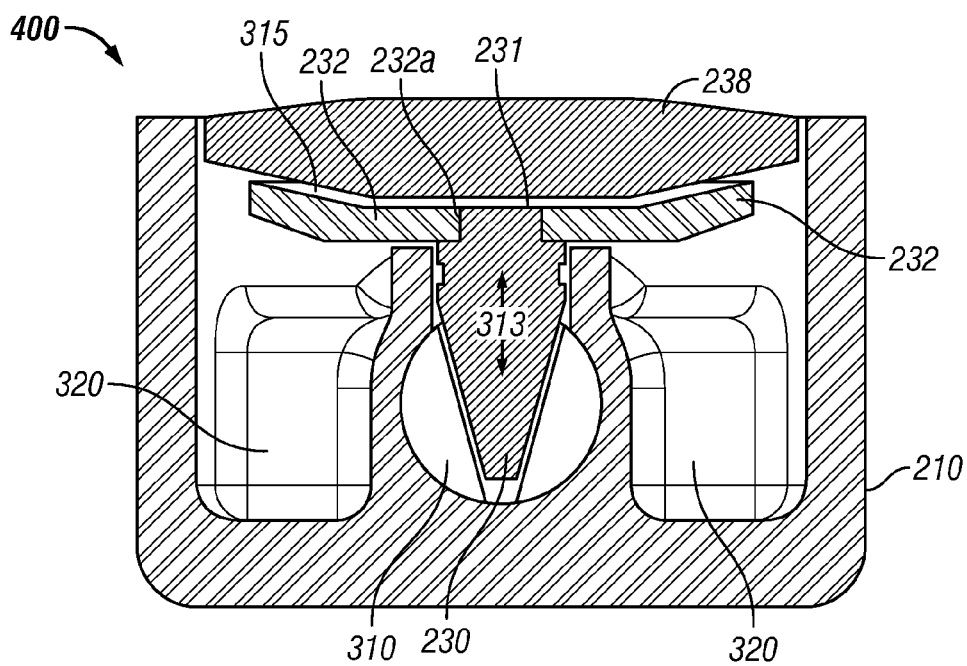
FIG. 4 is a cross-section diagram taken along B-B once the exemplary transducer shown in FIG. 1 has been assembled.

Still referring to FIG. 1, the tool 110 is further shown to include exemplary transmitters T1 and T2 made according to one embodiment of the disclosure, as described in more detail in reference to FIGS. 2-4. A transmitter circuit causes the transmitters T1 and T2 to transmit acoustic signals into the earth formation 113 via a fluid in the wellbore 101. Receivers R1 and R2 receive acoustic signals reflected by the earth formation 113 in response to the transmitted signals. A suitable electrical circuit C1 conditions the received signals and the control unit 170 and/or 190 process such conditioned signals to provide information about a parameter of interest. The tool 110 shown in FIG. 1 illustrates an exemplary wireline tool that provides information for determining or estimating a parameter of interest or property of the formation 113, including, but not limited to, acoustic porosity, bed boundary location, etc. In another aspect or configuration, the tool 110 may utilize transducers on a member 130, which transducers are placed proximate to or in contact with the borehole wall 103 for imaging the borehole wall 103. For the purpose of this disclosure, any acoustic tool may utilize one or more transducers made according to the teaching herein for estimating or determining a property of interest. Although FIG. 1 shows a wireline acoustic tool, the tool 110 may be a measurement-while-drilling acoustic tool (also referred to as logging-while-drilling tool) for estimating a parameter or property of interest during drilling of a wellbore. For drilling applications, the tool may be a part of a drilling assembly that is conveyed into the wellbore 101 by a jointed-tubular or a coiled-tubing. The telemetry system for communication of data between the tool 130 and the surface controller 190 may include any suitable telemetry method, including, but not limited to, mud pulse telemetry, radio frequency signal telemetry, electromagnetic telemetry; acoustic signal telemetry, and wired-pipe telemetry, including electrical conductors or optical fibers.

FIG. 2 is a perspective view of various transducer components laid out in the manner they are assembled to make transducer 200, according to one embodiment of the disclosure. The transducer components 200 include a tuned-resonant housing 210 that further includes a cavity 212 exposed at the top 214 of the housing 210. The housing 210 is further shown to include openings 216a and 216b on opposite sides 217a and 217b of the housing respectively. A movable hydraulic pressure member 230 sits inside a cavity 218 in the housing 210. In one aspect, the hydraulic pressure member 230 may be a conical member, as shown in FIG. 2. The hydraulic pressure member 230, however, may be of any suitable shape configured to move when a force is applied thereto, including, but not limited to, members having a spherical or half spherical shape, cylindrical shape and hybrid shape. The hydraulic pressure member 230 may be made form any suitable material, including, but not limited to, copper, brass, steel and another alloy. The hydraulic pressure member 230 may conform to the cavity 218 with a relatively small clearance gap 232a. The hydraulic pressure member 230 moves within the cavity 218 when a hydraulic pressure is applied to it. In the particular configuration of FIG. 2, the hydraulic pressure member 230 is a pressure cone that moves in a direction perpendicular to the direction of the applied force, as described in more detail in reference to FIGS. 3 and 4.

Still referring to FIG. 2, a member 232 is seated on top of the hydraulic pressure member 230. In the particular configuration of FIG. 2, the member 232 is shown to be a diaphragm pressure piston. Any other shape may also be utilized. In one configuration, the top end 231 of the hydraulic pressure member 230 is seated inside an opening 232a of the diaphragm pressure piston 232. In one aspect, the diaphragm pressure piston 232 is configured to exert force on an acoustic member 238. In the particular configuration of FIG. 2, the acoustic member 238 is shown to be an acoustic diaphragm inserted in the opening of the housing. The acoustic diaphragm 238 is placed on top of housing cavity 212 and sealed to housing 210 with a circumferential o-ring or other flexible bellows structure. The acoustic diaphragm 238 is retained in housing cavity 212 with an elastomeric material filling the cavity 212. The motion of acoustic diaphragm 238 is developed by motion of the diaphragm pressure piston 232 creating a pressure wave in the elastomeric material filling cavity 212. A substantial surface of the acoustic member 238 is exposed to the outer environment. The acoustic diaphragm 238 generates a pressure wave in the medium surrounding it when a force is applied to a surface 238a, as described in more detail in reference to FIGS. 3 and 4.

Still referring to FIG. 2, the combination of a preload canister housing 252a, preload washers 254a, interface adapter 256a, an active element (source) 260a and a preload canister base 270a create an electro-mechanical actuator assembly. This assembly via the interface adapter 256a is attached to an actuator piston 250a where they are placed in the tuned-resonant structural housing 210 through the side opening 216a and secured by screws (not shown) placed in the preload canister base 270a, via mating screw holes 271a into the tuned-resonant structural housing 210. The actuator piston 250a is shaped so that a linear motion of the actuator piston 250a will generate pressure in cavity 218 and cause the hydraulic pressure member 230 to move vertically in the cavity 218. The active member 260a may be any suitable linear actuation device that operates within desired frequency range, including, but not limited to a piezoelectric stack. Similarly a combination of a preload canister housing 252b, preload washers 254b, interface adapter 256b, an active member (source) 260b and a preload canister base 270b create a duplicate electro-mechanical actuator assembly. This assembly, via the interface adapter 256b, is attached to an actuator piston 250b where they are placed in the tuned-resonant structural housing 210 through the side opening 216b and secured by screws (not shown) placed in the preload canister base 270b, via mating screw holes 271b into the tuned-resonant structural housing 210. In this particular configuration two pistons are shown, however, any number of actuators may be utilized for the purposes of this disclosure. When the various components shown in FIG. 2 are placed in the housing 210 and secured, the assembled unit forms a sealed transducer 200. The various cavities and open spaces within the cavity 212 are filled with suitable highly incompressible elastomeric materials, as described in more detail in reference to FIGS. 3 and 4.

FIG. 3 is a cross-section 300 taken along the axis A-A of the exemplary assembled transducer 200 of FIG. 2. In the embodiment of FIG. 3, the housing 210 is shown to have an upper cavity 320 formed in an upper section 302 of the tuned-resonant structured housing 210, which cavity has an opening 321 at middle bottom of the upper section 302. The hydraulic pressure member 230 is movably placed in the cavity 218 below the opening 321. In this configuration, the hydraulic pressure member 230 is able to move up and down (along the vertical axis 313) in the cavity 218. The empty spaces around cavity 218 are filled with a hydraulic fluid 310. In aspects, the hydraulic fluid 310 may be any suitable highly incompressible liquid, including, but not limited to, any suitable hydraulic oil, mercury, and gallium indium. The upper end 231 of the hydraulic pressure member 230 sits inside an opening or bore 232a of the diaphragm pressure piston 232. In this particular configuration, the diaphragm pressure piston 232 is placed below the acoustic diaphragm 238 in a manner that provides a gap 315 between the diaphragm pressure piston 232 and the acoustic diaphragm 238. In one aspect, the gap 315 and the empty or open spaces in the cavity 320 may be filled with any suitable highly incompressible elastomeric material 322, such as silicon elastomer.

Still referring to FIG. 3, the actuator pistons 250a and 250b are in pressure communication with the hydraulic pressure member 230 via the hydraulic fluid 310 from opposite sides of the cavity 218. The active element 260a is mechanically coupled to actuator piston 250a via the interface adapter 256a, while the active element 260b is mechanically coupled to the actuator piston 250b via the interface adapter 256b. In the transducer configuration of FIG. 3, an axial or linear motion (displacement) of the active elements 260a and 260b toward the hydraulic pressure member 230 causes a certain displacement of the hydraulic fluid 310 from two sides, which displacement, in turn causes the hydraulic pressure member 230 to move in the direction 313 by a certain amount, based on the surface areas A1 of the actuator members 250a and 250b and an area A2 of the hydraulic pressure member 230. As an example and not as a limitation, assuming that a surface area A1 of the actuator members 250a and 250b interacts with a surface area A2 of the hydraulic pressure element 230, where A1>A2, then the displacement of the hydraulic pressure member 230 relative to the displacement of the active elements 260a and 260b will be k×(A1/A2). Where k is the number of actuators.

The displacement of hydraulic pressure member 230 and corresponding motion of the attached pressure piston 232 generate a pressure wave in the elastomeric material filling cavity 322 that creates motion of acoustic diaphragm 238. The acoustic diaphragm 238 imparts pressure in the medium surrounding the pressure diaphragm 238, such as wellbore fluid, to generate a pressure pulse or an acoustic wave in the medium. Thus, an axial movement D1 of the active elements 260a and 260b will cause the hydraulic pressure member 230 to move upward by a distance D2, wherein D2=D1 (2×A1/A2). For the purpose of this disclosure the ratio A1/A2 is greater than 1. A ratio of 4 to 1 has been determined to provide an acoustic transducer with a relatively large frequency range from 1 KHz to over 40 KHz. The transducer, however, may be configured to operate outside the above-noted frequency, including up to the resonant frequency of the transducer.

FIG. 4 shows a cross-section 400 taken along axis B-B of the exemplary transducer 200 shown in FIG. 2, after it has been assembled. As shown, the hydraulic pressure member 230 is disposed inside the cavity 218 filled with hydraulic fluid 310. The upper end 231 is seated inside the opening 232a of the pressure piston 232. The upper cavity 320 in the housing 210 is filled with the highly incompressible material 322. The acoustic diaphragm 238 is seated above the pressure piston 232 with a gap 315 there between.

Thus, in the particular transducer configuration shown in FIGS. 3 and 4, the active elements 260a and 260b are configured to move by an equal distance when they are subjected to the same excitation, such as electrical potential in the case of piezoelectric active elements. The active elements 260a and 260b may be calibrated in a laboratory so that each such element extends equally upon application of equal excitation. In operation, a selected voltage is applied to both active elements 260a and 260b simultaneously from an electrical source V. A displacement D1 of the active elements 260a and 260b displaces their associated actuator pistons 250a and 250b by D1. Each actuator piston then displaces the highly incompressible fluid 310 in the cavity 218, which displaces the hydraulic pressure member 230 along the vertical direction 313 by a displacement D2 toward the pressure piston 232. The movement D2 of the pressure piston 232 causes the acoustic diaphragm 238 to generate an acoustic wave in the medium surrounding the acoustic diaphragm 238. A sinusoidal voltage V generates a corresponding sinusoidal displacement on active members 260a and 260b, thereby generating a resulting sinusoidal motion on acoustic diaphragm 238 by the mechanics previously described. A sinusoidal pressure wave is thereby generated in surrounding well-based medium and formation.

Thus, in aspects, in a transducer made according one embodiment of the disclosure, a relatively large force and small displacement of active elements, such as elements 260a and 260b, is transformed into a larger displacement of and a smaller force on the pressure member, such as the hydraulic pressure member 230, which larger displacement controls the motion of an acoustic member, such as the acoustic diaphragm 238. The motion of the acoustic member may be controlled via intermediate elements, such as the pressure piston 232 and the elastomeric material 315 to produce acoustic signals in a medium, such as a wellbore fluid. In another embodiment, the hydraulic pressure member 230 may be directly connected to the acoustic diaphragm 238. Thus, in general, a volumetric change of a confined incompressible or substantially incompressible fluid is utilized to amplify displacement of an active element to generate acoustic waves.

Thus, in one embodiment of a transducer made according to a particular embodiment of the disclosure, a displacement amplification of an acoustic element is achieved, wherein linear (axial) motion Dx of two opposing actuator members (having cross-sectional area Ax, each attached to opposing active elements) affects a volume change on a confined hydraulic fluid filling a cavity. In a direction normal to the axial motion of the opposing active elements, the hydraulic cavity includes an outlet containing a single hydrodynamic pressure member (having projected cross-sectional area (λr·Ax), with λr<0.5). The hydrodynamic pressure member, positioned and directed along a radial direction to the axis of the active elements' axial motion in the hydraulic cavity, responds with a radial motion on a diaphragm pressure piston integrally attached to the hydrodynamic pressure member. Due to the mechanical advantage created with the hydraulic cavity and hydrodynamic pressure member, the diaphragm pressure piston motion is greater in magnitude than the sum of the displacements of the active elements by a displacement amplification factor. The displacement amplification factor is equal to 2/λr for unconstrained quasi-static displacements but in actuality the factor is highly frequency dependent and may be less than 2/λr due to compressibility of the hydraulic fluid and elastic stiffness and dynamic mass of the active elements. As a consequence, the hydrodynamic pressure member performs a parallel function to maximize the stiffness of the fluid in the cavity by minimizing the net volume of the hydraulic cavity.

In one aspect, the pressure piston 232 is designed to exhibit a dynamically self-stabilizing characteristic that maintains a consistently low surface deformation of the acoustic diaphragm when subjected to loading from the elastomeric cavity pressure wave. In one aspect, the stabilization created on the acoustic diaphragm surface 238 is maintained over a broad operational frequency range. A suitable acoustic diaphragm for the purpose of this disclosure is described in U.S. Patent Application Ser. No. 61/316,526, filed Mar. 23, 2010, assigned to the assignee of this application, which application is incorporated herein by reference in entirety.

In another aspect, any suitable broad-bandwidth actuating elements may be used as the active element 260a and 260b for the purpose of this disclosure. In one aspect, the active elements 260a and 260b may be multilayered piezoelectric stacks that provide broad frequency bandwidth acoustic energy, such as over a frequency range of 4 kHz-25 KHz. However, certain piezoelectric actuator devices tend to degrade in the lower frequency range of 1 KHz-3 KHz, primarily due to the limited displacement of the piezoelectric actuator stack. Incorporation of a mechanism that utilizes a mechanical advantage on the piezoelectric actuation can potentially extend the lower frequency range of acoustic output to include the 1 kHz-3 kHz bandwidth.

In another aspect, as described above, pressure cone 230 utilizes a hydrodynamic pressure mechanism to create mechanical advantage on actions of the active elements 260a and 260b for frequency-specific motion of the acoustic diaphragm 238. In one aspect, the active elements 260a and 260b have inherent broad frequency bandwidth displacement output characteristics suitable for well logging. In one aspect, the active elements 260a and 260b are configured to generate significant acoustic energy levels from the acoustic diaphragm 238 (>1 psi peak) down to a lower frequency range of approximately 2 kHz.

Although the above-noted embodiments and methods are described that the incompressible fluid amplifies the displacement of the second member, the device may be made wherein the area of the first member is less than the area of the second member so that a larger force is applied to the second member but has a smaller displacement. In other aspects, the displacement of both the members may be the same.

The foregoing disclosure is directed to certain specific embodiments and method for ease of explanation. Various changes and modifications to such embodiments, however, will be apparent to those skilled in the art. All such changes and modifications are considered to be a part of this disclosure and within the scope of any appended claims.

The invention claimed is:

1. An apparatus for use downhole, comprising:
   an acoustic transducer having a first member in pressure communication with a substantially incompressible confined fluid, a second member in pressure communication with the substantially incompressible fluid, wherein a displacement of the first member causes the confined fluid to transform a larger first force and a smaller first displacement of the first member to a smaller second force and a larger second displacement of the second member to generate a pressure wave in a medium;
   an acoustic diaphragm in pressure communication with the second member configured to generate the pressure wave in the medium; and
   a pressure piston between the acoustic diaphragm and the second member.

2. The apparatus of claim 1 further comprising a chamber containing the substantially incompressible confined fluid.

3. The apparatus of claim 1, wherein the first member includes at least one linear actuator configured to move the first member in response to an electrical signal.

4. The apparatus of claim 3, wherein the at least one linear actuator is a piezoelectric material stack.

5. The apparatus of claim 1, wherein the second member moves in a direction substantially perpendicular to direction of movement of the first member.

6. The apparatus of claim 1, wherein the displacement of the second member is a function of a first area associated with the first member and a second area associated with the second member.

7. The apparatus of claim 6, wherein the first area is greater than the second area.

8. The apparatus of claim 1, wherein the pressure piston is anchored in a cavity.

9. The apparatus of claim 1, wherein (i) the first member includes movable members P1-Pn, where "n" is equal or greater than two and wherein each movable member has an area A; (ii) the second member has an area B; and (iii) the displacement of the second member is defined as $(n \times A)/B$.

10. A method of determining a property of a formation, comprising:
    conveying a tool in a wellbore that includes:
       an acoustic transducer having a first member in pressure communication with a substantially incompressible confined fluid, a second member in pressure communication with the substantially incompressible fluid, wherein a displacement of the first member causes the confined fluid to transform a larger first force and a smaller first displacement of the first member to a smaller second force and a larger second displacement of the second member to generate a pressure wave in a medium;
       an acoustic diaphragm in pressure communication with the second member configured to generate the pressure wave in the medium; and
       a pressure piston between the acoustic diaphragm and the second member;
    generating acoustic waves in the wellbore by the acoustic transducer at a selected frequency;
    receiving acoustic waves from a formation surrounding the tool responsive to the generated acoustic waves; and
    processing signals corresponding to the received acoustic waves to determine the property of the formation.

11. The method of claim 10, wherein amplification is a function of a ratio of areas of the first member and the second member.

12. The method of claim 11 wherein the ratio is selected to provide an operating frequency range for the transducer up to 40 KHz.

* * * * *